Oct. 7, 1958  J. W. WILKINSON  2,855,103
FILTER CARTRIDGE
Filed Nov. 30, 1956
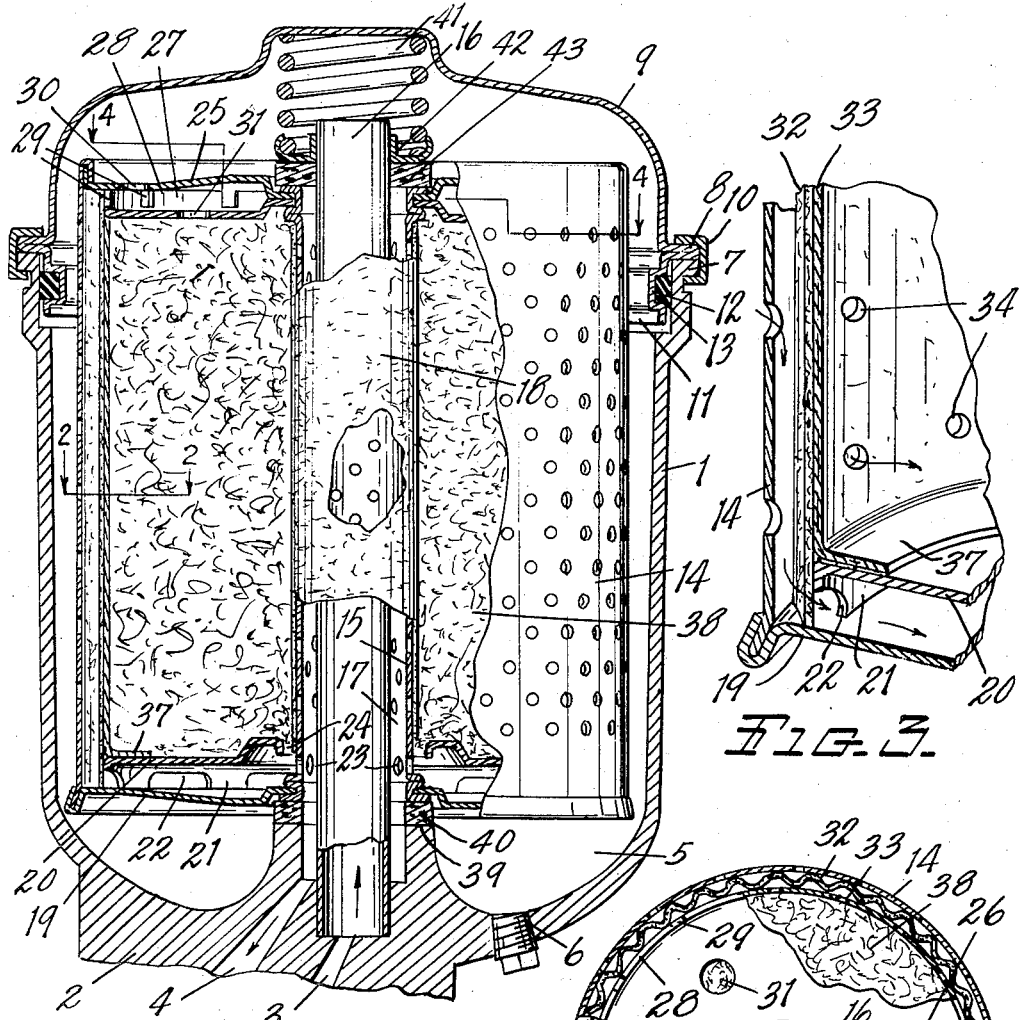
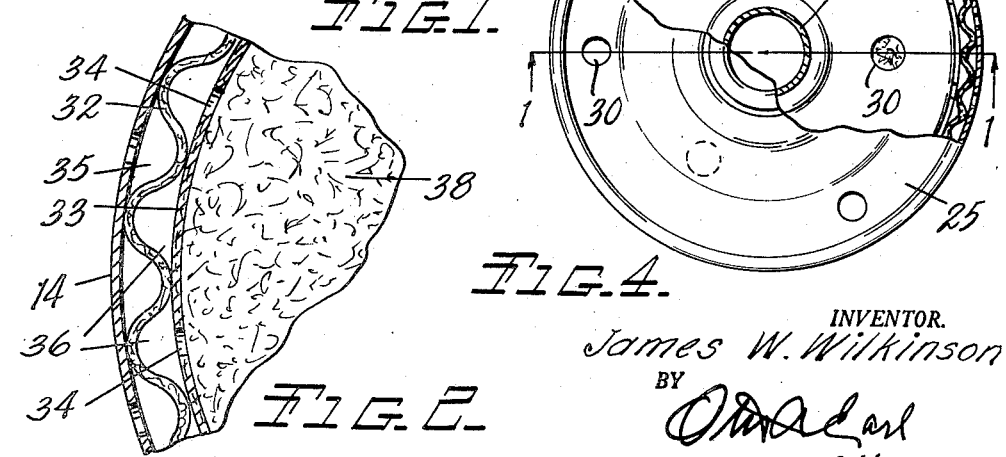
INVENTOR.
James W. Wilkinson
BY
Attorney.

United States Patent Office 2,855,103
Patented Oct. 7, 1958

2,855,103

FILTER CARTRIDGE

James W. Wilkinson, Hastings, Mich., assignor to Hastings Manufacturing Company, Hastings, Mich.

Application November 30, 1956, Serial No. 625,423

8 Claims. (Cl. 210—315)

This invention relates to a filter cartridge which is adapted for the filtering of lubricating oil of internal combustion engines and the like.

The main objects of this invention are:

First, to provide a filter of the so-called free flow type which is, at the same time, highly efficient in filtering the lubricant passed therethrough.

Second, to provide a filter cartridge which cannot become clogged.

Third, to provide a filter cartridge in which the parts are relatively simple and economical to produce and may be rapidly and economically assembled.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in vertical section on a line corresponding to line 1—1 of Fig. 4.

Fig. 2 is an enlarged fragmentary view in section on a line corresponding to line 2—2 of Fig. 1.

Fig. 3 is an enlarged fragmentary perspective view sectioned on a line generally corresponding to that of Fig. 1.

Fig. 4 is a fragmentary view partially in section on a line corresponding to broken line 4—4 of Fig. 4.

In the accompanying drawing I have illustrated the filter cartridge embodiment of my invention in its operative associated relation to a casing, which is closed except for inlet and outlet connections.

The casing illustrated comprises a body member 1, desirably formed as a casting and provided with a bottom 2 having an inlet passage 3 and an outlet passage 4 therein. The bottom is conformed to provide a sump 5 having a drain opening 6. The body member has an outturned flange 7 at its upper end providing a seat for the flange 8 of the top or cover member 9.

The cover is secured by means of the coupling 10, the details of which are not illustrated as they form no part of this invention. The cover or top member is provided with a skirt portion 11 depending within the body member and having an outwardly facing gasket seat 12 for the gasket 13 which sealingly engages the wall of the body member.

In the embodiment of my invention illustrated, the cartridge comprises an outer foraminate cylindrical wall 14 and an inner foraminate cylindrical wall 15 which is of relatively small diameter and disposed concentrically relative to the outer wall.

The inner wall is adapted to receive the inlet tube 16 which is mounted on the bottom of the housing and projects upwardly centrally of the casing. The inner wall 15 is of such diameter so as to provide a discharge passage 17 around the inlet tube and opening at its lower end to the discharge passage 4. The inner wall is surrounded by a sheet of filtering material 18, desirably a felted sheet as distinguished from a woven sheet. One of the purposes of the filtering material 18 is to prevent the fibrous filtering material from entering and clogging the holes in the inner wall.

The imperforate outer bottom wall 19 is seamed to the bottoms of the outer and inner walls. The inner bottom member 20 is provided with a downturned flange 221 at its outer edge, resting upon the outer bottom member, the flange being provided with a series of openings 22. The outer bottom wall and the inner bottom member 20 coact to provide a discharge header. The inner wall is provided with an annular series of openings 23 disposed below the inner bottom member, which serve as outlets for the discharge header. The inner edge of the inner bottom member is spaced from the inner upright wall to provide an annular discharge 24 for the filtering medium chamber.

The outer top wall 25 is seamed or otherwise connected to the outer side wall and the inner upright wall. The inner top wall 26 is spaced from the outer top wall to provide an inlet header chamber 27, its inner edge being seamed to the inner upright wall, and its outer edge being spaced from the outer side wall and provided with an upturned flange 28 having an annular series of discharge openings 29 therein. The outer top wall is provided with header inlet openings 30 in the flange 28 and is provided with an annular series of discharge openings 31 which open centrally to the filtering medium chamber.

The vertically corrugated member 32 is disposed within the outer side wall in supported relation thereto. This member 32 is formed of fiberboard like material which permits the passage of the lubricant or other filtered liquid therethrough. At the inner side of the corrugated member 32 is an inner side wall member 33, which is also of fibrous material and is provided with a plurality of holes 34, desirably uniformly spaced throughout.

The corrugated member 32, coacting with the outer side wall 14 and the inner side wall 33, provides or defines an outer series of vertical channels 35 and an inner series of vertical channels 36. The ends of the member 32 abut the outer top and bottom walls so that the inner channels open to or register with the inlet header openings 29. The outer channels provide relatively free flow, and a substantial quantity of the circulated liquid passes through the member 32 into the discharge channel.

The inner side member 33 is preferably provided with inturned flange portions 37 at its lower end, which are lapped upon and adhesively secured to the inner bottom member.

The inner upright wall, the inner side wall and the inner top and bottom wall members define a filtering medium chamber which has fibrous filtering material indicated at 38, packed therein to a substantially uniform density. Desirably, this filtering material is of cotton linters having their full wax content.

The cartridge is removably supported within the casing, the bottom of which is provided with an upwardly projecting annular gasket seat 39 spaced from the inlet tube and on which is arranged the gasket 40 in supporting and sealing relation to the cartridge, which is urged against the gasket 40 by means of the coil spring 41 seated within the top member of the casing and provided with an annular thrust member 42 engaging the gasket 43 seated upon the upper end of the cartridge and which is in sealing relation to the inlet tube 16. By this arrangement the cartridges can be removed and inserted when the top member is removed and are held in properly centered relation to the casing.

The incoming lubricant or other material to be filtered enters through the passage 3 and is discharged at the upper end of the tube 16 above the cartridge. A restricted portion of the circulating liquid enters the inlet header through the ports 30 and is discharged into the filtering chamber through the ports or outlets 31 and to the inner series of vertical channels through the peripheral ports 34.

The remainder of the circulated liquid enters the filter through the perforations of the outer side wall thereof, which are arranged to provide a substantially uniform distribution. Some of the material passing through the outer side wall flows through the outer channels to the discharge header and is somewhat filtered by passing through the corrugated filtering member, but the main purpose is to provide a substantially free flow of a minor portion of the filtered material.

The major portion of the filtered material passes through the filtering member 32 and is distributed very uniformly by the inner series of channels to the filtering mass in the filtering chamber. While the inner side wall is provided with perforations which are uniformly distributed therein, this inner member is desirably of fibrous material so that a portion of the liquid may pass therethrough rather than through the openings therein.

This arrangement serves to uniformly distribute the filtered liquid from top to bottom of the filtering medium within the filter chamber and avoids setting up flow passages therein. The cotton linter filtering material does not settle and it does not become water-logged.

I have illustrated and described a highly practical embodiment of my invention. I have not attempted to illustrate or describe other adaptations or embodiments as it is believed that this disclosure will enable those skilled in the art to embody or adapt my invention as may be desired.

Having thus described the invention, what is claimed as new and is desired to be secured by Letters Patent is:

1. A filtering cartridge comprising concentric radially spaced foraminate outer side and inner upright walls, an imperforate outer bottom wall connected to the lower ends of said outer side and inner walls, an imperforate inner bottom member having a downturned flange at its outer edge disposed on said bottom in spaced relation to said outer wall, said outer and inner bottom wall defining a discharge header, said inner upright wall having header outlet openings therein, the inner edge of said inner bottom wall being spaced from said inner upright wall providing a discharge opening to said discharge header, an outer top wall connected to the upper ends of said inner and outer upright members, an inner top wall having an upturned flange at its outer edge spaced from the outer upright wall, said outer and inner top walls defining an inlet header, said outer top wall having angularly spaced inlet openings to said inlet header adjacent its outer edge, said inner top wall having angularly spaced outlet openings disposed centrally relative to its inner and outer edges, and said flange of said inner top wall having angularly spaced header outlet openings therein, a vertically corrugated member of filtering material disposed within said outer side wall with its ends between the outer side wall and said flanges of said inner bottom and top walls, a foraminate inner side wall disposed on the inner side of said corrugated member with its bottom edge turned inwardly and secured to said inner bottom member, said outer and inner side walls and said corrugated member defining an outer and an inner series of vertical channels, said inlet header outlet openings in said flange of said inner top wall opening to certain of the said inner channels, said inner side wall, inner wall, inner bottom and inner top walls defining a filtering chamber, said filtering chamber having substantially uniformly compacted fibrous material therein, said centrally disposed outlet openings on said inner top wall discharging on the top of the fibrous material within the filtering chamber.

2. A filtering cartridge comprising concentric radially spaced foraminate outer side and inner upright walls, an imperforate outer bottom wall connected to the lower ends of said outer side and inner walls, an imperforate inner bottom member having a downturned flange at its outer edged disposed on said bottom in spaced relation to said outer wall, said outer and inner bottom wall defining a discharge header, an outer top wall connected to the upper ends of said inner and outer upright members, an inner top wall having an upturned flange at its outer edge spaced from the outer upright wall, said outer and inner top walls defining an inlet header, said outer top wall having an inlet opening to said inlet header, said inner top wall having outlet openings therein, and said flange of said inner top wall having angularly spaced header outlet openings therein, a vertically corrugated member of filtering material disposed within said outer side wall with its ends between the outer side wall and said flanges of said inner bottom and top walls, a foraminate inner side wall disposed on the inner side of said corrugated member, said outer and inner side walls and said corrugated member defining an outer and an inner series of vertical channels, said inlet header outlet openings in said flange of said inner top wall opening to certain of the said inner channels, said inner side wall, inner wall, inner bottom and inner top walls defining a filtering chamber, said filtering chamber having substantially uniformly compacted fibrous material therein, said outlet openings in said inner top wall discharging upon the fibrous material in said filtering chamber.

3. A filtering cartridge comprising concentric radially spaced foraminate outer side and inner upright walls, an imperforate outer bottom wall connected to the lower ends of said outer and inner walls, an imperforate inner bottom member spaced from said outer bottom wall and coacting therewith to provide a discharge header, said inner upright wall having header outlet openings therein, the inner edge of said inner bottom wall being spaced from said inner upright wall providing a discharge opening to said discharge header, an outer top wall connected to the upper ends of said inner and outer upright members, an inner top wall spaced from said outer top wall and coacting therewith to provide an inlet header, said outer top wall having angularly spaced inlet openings to said inlet header adjacent its outer edge, said inner top wall having angularly spaced outlet openings disposed centrally relative to its inner and outer edges, a vertically corrugated member of fibrous material disposed within said outer side wall, a foraminate inner side wall disposed on the inner side of said corrugated member, said outer and inner side walls and said corrugated member defining an outer and an inner series of vertical channels, said inlet header having outlets opening to at least a part of said inner channels, said inner side wall, inner wall, inner bottom and inner top walls defining a filtering chamber having fibrous material therein, said outlet openings in said inner top wall discharging upon the fibrous material in said filtering chamber.

4. A filtering cartridge comprising concentric radially spaced foraminate outer side and inner upright walls, an imperforate outer bottom wall connected to the lower ends of said outer and inner walls, an imperforate inner bottom member spaced from said outer bottom wall and coacting therewith to provide a discharge header, an outer top wall connected to the upper ends of said inner and outer upright members, an inner top wall spaced from said outer top wall and coacting therewith to provide an inlet header, said outer top wall having a header inlet opening, a vertically corrugated member of fibrous material disposed within said outer side wall, a foraminate inner side wall disposed on the inner side of said corrugated member, said outer and inner side walls and said corrugated member defining an outer and an inner series of vertical channels, said inlet header having outlets opening to at least a part of said inner channels, said inner side wall, inner wall, inner bottom and inner top walls defining a filtering chamber having fibrous material therein, said inlet header having outlet openings to the top of said filtering chamber discharging upon the top of the filtering material therein.

5. A filtering cartridge comprising radially spaced foraminate outer side and inner upright walls, outer and inner bottom walls spaced to provide a discharge header, outer and inner top walls spaced to provide an inlet header, said outer top wall having an annular series of header inlet openings disposed adjacent its outer edge, said inner top wall having an annular series of header outlet openings disposed centrally thereof and having a peripheral series of outlet openings, a vertically corrugated member of filtering material disposed within said outer side wall, a pervious inner side wall disposed within said corrugated member, said outer and inner side walls and said corrugated member defining an outer series and an inner series of vertical channels, said corrugated member surrounding said inner bottom and top member, said inlet header having discharge connections to at least a part of said inner channels, said inner side wall, inner wall, inner bottom and inner top walls defining a filtering chamber having fibrous material therein, said annular series of header outlet openings in said inner top wall discharging directly upon the filtering material within the filtering chamber.

6. A filtering cartridge comprising radially spaced foraminate outer side and inner upright walls, outer and inner bottom walls spaced to provide a discharge header, outer and inner top walls spaced to provide an inlet header, said outer top wall having an annular series of header inlet openings disposed adjacent its outer edge, said inner top wall having an annular series of header outlet openings disposed centrally thereof and having a peripheral series of outlet openings, a vertically corrugated member of filtering material disposed within said outer side wall, a pervious inner side wall disposed within said corrugated member, said outer and inner side walls and said corrugated member defining an outer series and an inner series of vertical channels, said inlet header having discharge connections to at least a part of said inner channels, said inner side wall, inner wall, inner bottom and inner top walls defining a filtering chamber having fibrous material therein, said annular series of header outlet openings in said inner top wall discharging directly upon the filtering material within the filtering chamber.

7. A filtering cartridge comprising radially spaced foraminate outer side and inner upright walls, outer and inner bottom walls spaced to provide a discharge header, outer and inner top walls spaced to provide an inlet header, said outer top wall having header inlet openings therein, a vertically corrugated member disposed within said outer side wall, a pervious inner side wall disposed within said corrugated member, said outer and inner side walls and said corrugated member defining an outer series and an inner series of vertical channels, said corrugated member surrounding said inner bottom and top members, said inlet header having discharge connections to at least a part of said inner channels, said inner side wall, inner wall, inner bottom and inner top walls defining a filtering chamber having fibrous material therein, said inner top wall having header discharge outlet openings therein positioned to discharge upon the upper end of the fibrous material in the filtering chamber.

8. A filtering cartridge comprising radially spaced foraminate outer side and inner upright walls, outer and inner bottom walls spaced to provide a discharge header, outer and inner top walls spaced to provide an inlet header, said outer top wall having header inlet openings therein, a vertically corrugated member disposed within said outer side wall, a pervious inner side wall disposed within said corrugated member, said outer and inner side walls and said corrugated member defining an outer series and an inner series of vertical channels, said inlet header having discharge connections to at least a part of said inner channels, said inner side wall, inner wall, inner bottom and inner top walls defining a filtering chamber having fibrous material therein, said inner top wall having header discharge outlet openings therein positioned to discharge upon the upper end of the fibrous material in the filtering chamber.

References Cited in the file of this patent
UNITED STATES PATENTS
2,750,042    Wilkinson _____ June 12, 1956